(12) United States Patent
Kovacs et al.

(10) Patent No.: US 10,098,375 B2
(45) Date of Patent: *Oct. 16, 2018

(54) FORCED-CONVECTION, STEAM-HEATING OF NUTS WITH PREHEATING

(71) Applicant: Laitram, L.L.C., Harahan, LA (US)

(72) Inventors: Joseph F. Kovacs, New Orleans, LA (US); James M. Lapeyre, III, New Orleans, LA (US); Michael V. Sclafini, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/402,889

(22) Filed: Jan. 10, 2017

(65) Prior Publication Data

US 2017/0127715 A1     May 11, 2017

Related U.S. Application Data

(63) Continuation-in-part of application No. 15/122,824, filed as application No. PCT/US2014/019789 on Mar. 3, 2014.

(51) Int. Cl.
    *A23N 12/08*     (2006.01)
    *A23B 7/005*     (2006.01)
    (Continued)

(52) U.S. Cl.
    CPC ............ *A23N 12/08* (2013.01); *A23B 7/0053* (2013.01); *A23L 3/00* (2013.01); *A23L 3/18* (2013.01);
    (Continued)

(58) Field of Classification Search
    CPC ........ A23N 12/00; A23N 12/06; A23N 12/08; A23N 12/083; A23N 12/12; A23N 12/125;
    (Continued)

(56) References Cited

U.S. PATENT DOCUMENTS

| | | |
|---|---|---|
| 3,982,481 A | 9/1976 | Console et al. |
| 4,167,585 A | 9/1979 | Caridis et al. |

(Continued)

FOREIGN PATENT DOCUMENTS

| | | |
|---|---|---|
| CN | 101238864 B | 7/2011 |
| EP | 0429822 A1 | 6/1991 |

(Continued)

OTHER PUBLICATIONS

Extended European Search Report of the European Patent Office, European Application No. 14884968, dated Oct. 27, 2017, Munich, Germany.

(Continued)

*Primary Examiner* — Drew E Becker
*Assistant Examiner* — Bryan Kim
(74) *Attorney, Agent, or Firm* — James T. Cronvich

(57) ABSTRACT

Method for pasteurizing almonds and other nuts with steam at atmospheric pressure. The amount of condensation on and the consequent water uptake of nuts is limited by pasteurizing the nuts in a heating chamber with a gaseous atmosphere including a steam mixture and forming a forced-convection path through the nuts. The limited water uptake maintains the quality of the nuts. A forced-convection steam cooker conveying food products on a foraminous conveyor belt forces the steam mixture through the nuts. A preheater preheats the nuts so that they can be pasteurized in the steam cooker at a temperature of between 85° C. and 99° C. to reduce the dwell time and increase throughput.

9 Claims, 2 Drawing Sheets

(51) Int. Cl.
*A23L 25/00* (2016.01)
*A23L 3/18* (2006.01)
*A23N 12/00* (2006.01)
*A23L 3/00* (2006.01)
*A23B 9/02* (2006.01)
*A23L 11/00* (2016.01)

(52) U.S. Cl.
CPC .............. *A23L 25/20* (2016.08); *A23N 12/00* (2013.01); *A23B 9/025* (2013.01); *A23L 11/01* (2016.08); *A23V 2002/00* (2013.01)

(58) Field of Classification Search
CPC ... A23L 3/00; A23L 3/16; A23L 3/165; A23L 3/18; A23L 11/00; A23L 11/01; A23L 11/03; A23B 7/00; A23B 7/005; A23B 7/0053; A23B 7/0205; A23B 9/00; A23B 9/02; A23B 9/025
See application file for complete search history.

(56) References Cited

U.S. PATENT DOCUMENTS

| | | | |
|---|---|---|---|
| 4,255,459 A | 3/1981 | Glen | |
| 4,521,439 A | 6/1985 | Bengtsson et al. | |
| 4,525,370 A | 6/1985 | Parkes | |
| 4,582,067 A | 4/1986 | Williams | |
| 4,775,544 A | 10/1988 | Brown et al. | |
| 4,829,892 A * | 5/1989 | Brown | B01J 8/44 99/475 |
| 4,942,810 A | 7/1990 | Zittel et al. | |
| 4,965,435 A | 10/1990 | Smith et al. | |
| 5,156,873 A | 10/1992 | Skrmetta | |
| 6,274,188 B1 | 8/2001 | Ledet et al. | |
| 6,350,409 B1 | 2/2002 | Aluess et al. | |
| 6,800,246 B2 | 10/2004 | Howe et al. | |
| 7,849,788 B2 * | 12/2010 | Macaluso | A23B 7/01 219/388 |
| 9,179,704 B2 * | 11/2015 | Perren | A23B 9/02 |
| 9,352,862 B2 * | 5/2016 | Yum | B65B 25/001 |
| 2006/0040029 A1 * | 2/2006 | Gunawardena | A23B 4/0053 426/521 |
| 2006/0127553 A1 * | 6/2006 | van der Meer | A21D 8/06 426/520 |
| 2006/0147594 A1 * | 7/2006 | Long | A23B 7/0053 426/521 |
| 2007/0082093 A1 * | 4/2007 | Savolainen | A21D 2/26 426/140 |
| 2008/0026123 A1 * | 1/2008 | Long | A23B 7/0053 426/461 |
| 2008/0032018 A1 | 2/2008 | Gamiss et al. | |
| 2010/0136192 A1 | 6/2010 | Perren et al. | |
| 2010/0159099 A1 | 6/2010 | Falgout et al. | |
| 2010/0173060 A1 * | 7/2010 | Perren | A23B 9/025 426/521 |
| 2012/0297639 A1 * | 11/2012 | van Felius | A23B 7/0205 34/443 |
| 2015/0024101 A1 | 1/2015 | DeKoomen | |
| 2015/0313268 A1 * | 11/2015 | Kafer | A23L 1/3175 426/55 |
| 2016/0235109 A1 * | 8/2016 | Cavestro | A23L 3/005 |

FOREIGN PATENT DOCUMENTS

| | | | |
|---|---|---|---|
| EP | 1754413 B1 | 11/2009 | |
| GB | 613042 A | 11/1948 | |
| WO | WO-03043665 A1 * | 5/2003 | ............ A23B 9/025 |
| WO | 2013192085 A1 | 12/2013 | |

OTHER PUBLICATIONS

International Search Report and Written Opinion of the International Searching Authority, PCT/US2018/012462, dated Apr. 30, 2018, Korean Intellectual Property Office, Republic of Korea.

* cited by examiner

FORCED-CONVECTION, STEAM-HEATING OF NUTS WITH PREHEATING

CROSS-REFERENCE TO RELATED APPLICATIONS

This application is a continuation-in-part of co-pending U.S. patent application Ser. No. 15/122,824, filed Aug. 31, 2016, which is a 35 U.S.C. § 371 application of PCT/US2014/019789, filed Mar. 3, 2014. The disclosures of both applications are incorporated into this application by reference.

BACKGROUND

The invention relates generally to steam cooking and more particularly to methods for steam-heating nuts with forced convection at temperatures below 100° C. (212° F.).

Nuts, such as almonds, are often pasteurized by immersion in hot water or an air-steam environment. Steam pasteurizers conventionally use the heat of condensation to heat the outer surfaces of nuts to temperatures high enough to deactivate enough micro-organisms to meet acceptable pasteurization levels. The nuts enter the steam pasteurizer at a temperature below the temperature of the steam. The steam condenses on the outer surface of the nuts and raises their temperature. But the condensation can wrinkle and loosen the outer skins of the nuts. In the case of almonds and other nuts to be sold in their skins, the nuts' uptake of water should be limited. One approach to limiting condensation in almonds is described in International Patent Publication No. WO 2013/171336. That document teaches pre-heating low-moisture foods to a temperature above or slightly below the condensation temperature of the water vapor in the heating chamber to limit condensation. Another approach, described in U.S. Patent Application Publication No. 2013/0040030, steams nuts at a pressure below atmospheric to limit water uptake. But pre-heating requires an additional heater, and a vacuum system requires batch and not continuous handling.

SUMMARY

One version of a method embodying features of the invention for pasteurizing nuts comprises: (a) conveying nuts along a conveying path through a preheating chamber; (b) conveying the nuts preheated in the preheating chamber along a conveying path through a heating chamber; (c) forcing a substantially homogeneous gaseous atmosphere comprising a steam mixture through the nuts in the heating chamber along a connection path intersecting the conveying path to heat the outer skins of the nuts and limit the amount of water condensation enrobing the nuts; (d) maintaining atmospheric pressure in the heating chamber; and (e) controlling the temperature of the gaseous atmosphere in the heating chamber to a heating temperature of greater than 85° C. and less than 99° C.

BRIEF DESCRIPTION OF THE DRAWINGS

These features and aspects of the invention, as well as its advantages, are described in more detail in the following description, appended claims, and accompanying drawings, in which:

DETAILED DESCRIPTION

Figure 1:
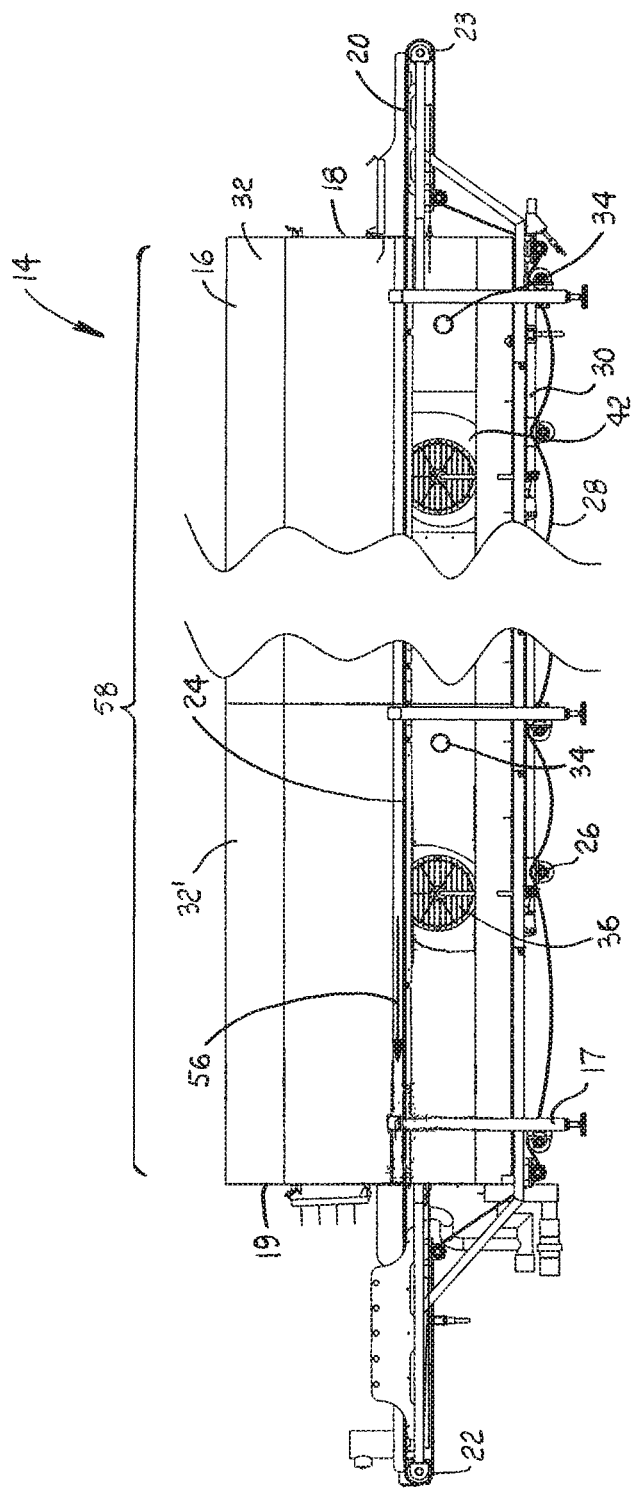
FIG. 1 is a side view of a portion of a steam cooker, with its facing sidewall removed for clarity, embodying features of the invention.

A steam cooker that operates according to and embodies features of the invention is shown in FIG. 1 with its facing side wall removed to better illustrate its components. The cooker 14, which is open to the atmosphere, has an enclosure 16 that is supported on legs 17 and extends from an entrance end 18 to an exit end 19. A foraminous conveyor belt 20 is trained around drive and idle sprockets 22, 23 at opposite ends of an upper carryway 24 that traverses the cooker. Diverting rollers or drums 26 guide the endless belt loop along a returnway 28 below the cooker. A network of steam pipes 30 injects steam supplied by a boiler or other steam source into the cooker through the bottom of the enclosure. The injection of steam is regulated by valves 31 (in FIG. 2) in the steam network.

Figure 2:
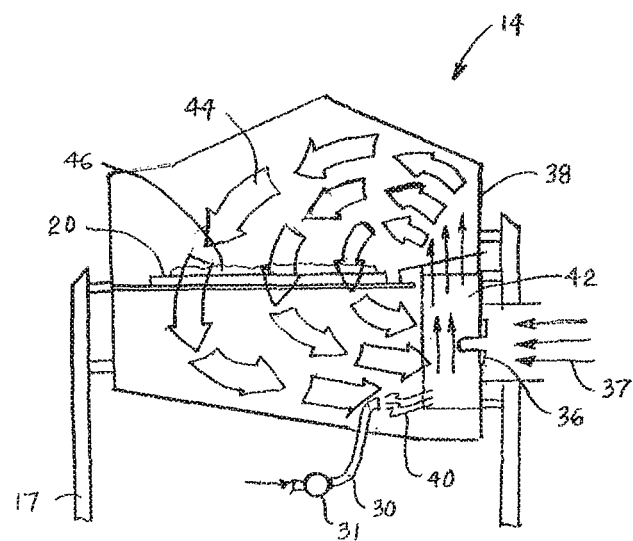
FIG. 2 is an axial cross sectional view of the steam cooker of FIG. 1.

The cooker shown is modular with at least two identical heating modules 32, 32'. More modules may be connected in series to lengthen the total low-temperature heating region. A single module could be used for food products that require only a brief heating time. Each module is individually controlled with its own steam valves. A feedback signal from a temperature-sensing probe 34 in each heating module is used by a controller, such as a programmable logic controller, to control the opening of the steam-injector valve to maintain a predetermined heating temperature in each module. The probe, the controller, and the valve provide a means for maintaining a pre-selected temperature in each module. Air circulators, such as fans 36 or blowers, draw air 37 into the cooker through one of the side walls 38, as also shown in FIG. 2. The fan also draws steam 40 injected into the cooker through openings in a plenum 42, in which the air and steam are mixed. The fan blows the air-steam mixture through openings in the top of the plenum. The air-steam mixture then circulates along a convection path, indicated by arrows 44, that intersects nuts 46 being conveyed atop the conveyor belt 20 along the carryway. The belt is foraminous to allow the air-steam mixture to pass through and also to allow any condensation to drain. Other features of such a forced-convection cooker as described thus far are given in U.S. Pat. No. 6,274,188, "Method for Steam-Cooking Shrimp at Reduced Temperatures to Decrease Yield Loss," Aug. 14, 2001, incorporated herein by reference. One example of such a cooker is the CoolSteam® cooker manufactured and sold by Laitram Machinery, Inc., of Harahan, La., U.S.A. Because of the thoroughness of the forced-convection heat treatment described, heat-treating at temperatures of less than 100° C. (212° F.) at atmospheric pressure is possible. In fact, temperatures in the heating region below 85° C. (185° F.) and preferably in the range from 62° C. (144° F.) to 79° C. (175° F.) are effective in blanching or pasteurizing almonds without blistering or loosening their skins because the low temperatures minimize the uptake of moisture by the almonds.

In operation, nuts, such as peanuts or almonds and other tree nuts, are conveyed into the steam cooker 14 by the conveyor belt 20 along a conveying path 56. The nuts are heated in a low-temperature cooking region 58 that may include one or more identical forced-convection heating modules 32, 32'. Air is drawn into the modules and mixed with steam to form a substantially homogeneous gaseous atmosphere of air (or other gas, such as nitrogen) and steam or water vapor. This steam mixture is circulated by an air circulator, such as a fan, in a convection path that intersects the food product. In this example the convection path is perpendicular to the conveying path 56, but it could intersect or cross the conveying path from other directions. Along with the low-temperature heat treatment, the forced-convection flow through the nuts shears condensation enrobing the nuts and inhibits the uptake of moisture. The duration of the heating—the dwell time—is set by one or more of: (a) the length of the low-temperature heating region 58, (b) the speed of the conveyor belt 20, (c) the temperature of the heating region, (d) the size and kind of nut, and (e) the thickness of the mat of nuts on the conveyor belt. For almonds, the dwell time may range from 4 to 9 minutes in order to achieve sufficient lethality, e.g., a 6 log reduction in a target organism, such as salmonella. The temperature of the heating region is measured by a temperature probe and controlled by the amount of steam introduced into the cooker in each module.

Figure 3:
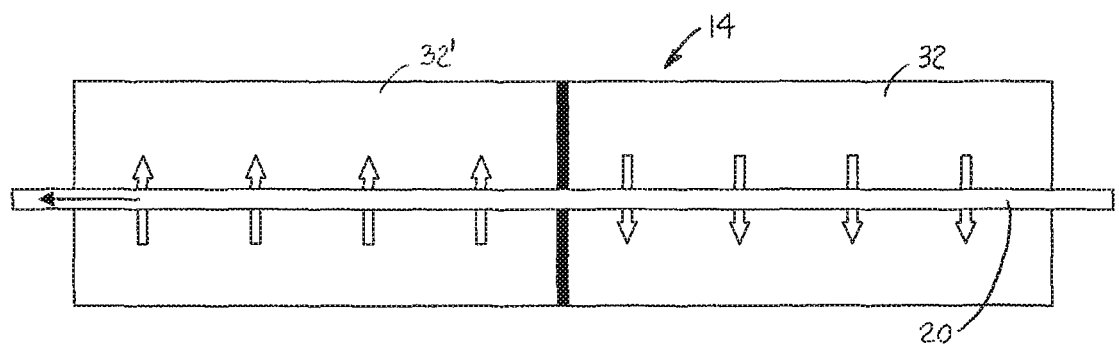
FIG. 3 is a side-elevation cross sectional view of the steam cooker of FIG. 1.

FIG. 3 shows the steam cooker 14 with two heating modules 32, 32'. In the first module 32, the convection path through the foraminous conveyor belt 20 and the conveyed nuts 46 is downward. In the second module 32', the convection path is upward through the nuts. Subjecting the nuts or other food products to both upward and downward convection flows results in a more uniform heat treatment.

Low-temperature pasteurization as described is effective in minimizing the deleterious uptake of water by the nuts. But pasteurizing nuts at lower temperatures requires a longer dwell time in the cooker to achieve the desired kill of pathogens. And longer dwell times lower product throughput.

Figure 4:
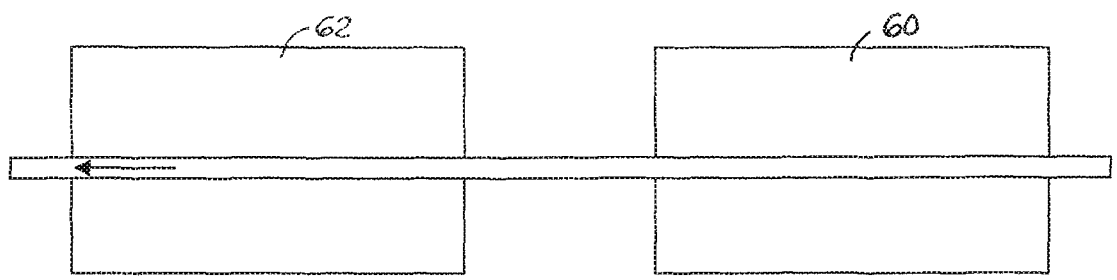
FIG. 4 is a block diagram of a steam cooker as in FIG. 1 with a preheating zone.

Preheating nuts in a low-humidity, dry-air preheating chamber 60, or preheater, before they are conveyed into a pasteurizing region 62, as shown in FIG. 4, reduces the uptake of moisture during subsequent pasteurization at higher temperatures, such as temperatures between 90° C. (194° F.) and 99° C. (210° F.) instead of below 85° C. (185° F.). For example, instead of pasteurizing room-temperature nuts in the low-temperature pasteurizing region for 4 min at 79° C. (175° F.), nuts preheated to a surface temperature of about 54° C. (130° F.) at a relative humidity of between 1% and about 60% can be pasteurized at 95° C. (203° F.) in just 1.75 min. The preheater heats the surfaces of the nuts to a temperature below the dew point, or condensation temperature, to ensure that condensation forms on the nuts' outer surfaces during pasteurization. Testing has shown that by preheating nuts in the preheater 60 for between about 1 min and about 6 min at a temperature of between about 57° C. (135° F.) and about 85° C. (185° F.) to raise the surface temperature of the nuts to between about 38° C. (100° F.) and about 70° C. (158° F.), nuts can be pasteurized in the forced-convection steam pasteurizing region 62 of the cooker at a temperature of between 85° C. (185° F.) and 99° C. (210° F.) for a dwell time of between about 1 min and about 6 min. This reduced pasteurization time improves throughput. Pasteurization can also be performed down to a temperature of 74° C. (165° F.) with longer dwell times.

Although the preheating chamber 60 has been described as a low-humidity, dry-heat heater, in other versions, the preheating chamber 60 can be a separate forced-convection steam cooker, an additional forced-convection heating module preceding the two modules 32, 32' of FIG. 1, or the first module 32 of FIG. 1.

What is claimed is:

1. A method for pasteurizing nuts, comprising:
conveying nuts along a conveying path through a preheating chamber;
conveying the nuts preheated in the preheating chamber atop a foraminous conveyor belt advancing along the conveying path through a heating chamber;
wherein the preheating chamber preheats the nuts to a surface temperature low enough below the condensation temperature in the heating chamber to ensure that condensation forms on the nuts in the heating chamber;
forcing a substantially homogeneous gaseous atmosphere formed by mixing air or another gas with steam injected into the heating chamber along a downward forced-convection path through the nuts and the foraminous conveyor belt with a fan to heat outer skins of the nuts through condensation but to limit the amount of condensate enrobing the nuts to prevent the outer skins from blistering;
maintaining atmospheric pressure in the heating chamber;
regulating the injection of the steam into the heating chamber to control the temperature of the gaseous atmosphere in the heating chamber to a heating temperature of greater than 85° C. and less than 99° C. to pasteurize the nuts.

2. The method of claim 1 wherein the temperature of the preheating chamber is between about 57° C. and about 85° C.

3. The method of claim 1 wherein the dwell time of the nuts in the preheating chamber is between about 1 min and about 6 min.

4. The method of claim 1 wherein the preheating chamber preheats the nuts to a surface temperature of between about 38° C. and about 70° C.

5. The method of claim 1 wherein the dwell time of the nuts in the heating chamber is between about 1 min and about 6 min.

6. The method of claim 5 wherein the dwell time of the nuts in the heating chamber is 4 min or less.

7. The method of claim 1 wherein the preheating chamber is a low-humidity, dry-air preheater maintaining a relative humidity of between 1% and 60%.

8. The method of claim 1 wherein the preheating chamber is a forced-convection steam cooker.

9. The method of claim 1 wherein the nuts are almonds having skins.

* * * * *